United States Patent [19]

Scribner et al.

[11] Patent Number: 4,629,871

[45] Date of Patent: Dec. 16, 1986

[54] ELECTRONIC POSTAGE METER SYSTEM SETTABLE BY MEANS OF A REMOTELY GENERATED INPUT DEVICE

[75] Inventors: Albert W. Scribner, Darien; Frank T. Check, Jr., Orange, both of Conn.

[73] Assignee: Pitney Bowes, Inc., Stamford, Conn.

[21] Appl. No.: 108,261

[22] Filed: Dec. 28, 1979

[51] Int. Cl.⁴ .............................................. G06F 5/10
[52] U.S. Cl. ................................. 235/375; 235/382; 235/382.5
[58] Field of Search ............. 364/464, 466, 467, 200, 364/900; 275/406, 375, 382.5, 377

[56] References Cited

U.S. PATENT DOCUMENTS

| | | | |
|---|---|---|---|
| 3,194,946 | 6/1961 | Rabinow | 235/428 |
| 3,716,698 | 2/1973 | Simjian | 235/485 |
| 3,792,446 | 2/1974 | McFiggins et al. | 364/900 |
| 3,938,095 | 2/1976 | Check, Jr. et al. | 364/900 |
| 4,168,533 | 9/1979 | Schwartz | 364/900 |
| 4,226,360 | 10/1981 | Simjian | 235/375 |
| 4,268,817 | 5/1981 | Simjian | 235/375 |

FOREIGN PATENT DOCUMENTS 2082120  3/1982  United Kingdom .

Primary Examiner—Harold I. Pitts
Attorney, Agent, or Firm—David E. Pitchenik; Albert W. Scribner; William D. Soltow, Jr.

[57] ABSTRACT

A microprocessor controlled postal meter system having a postal meter with a postage printer. An accounting means maintains an accurate record of account of an amount chargeable by the meter and used by the printing means, and a data entry means for entering an amount to be charged to the accounting means, the improvement comprising a data entry medium removable from the postal meter system, the data entry medium having encoded thereon a unique combinational code for data transfer between the card and the accounting means.

4 Claims, 15 Drawing Figures

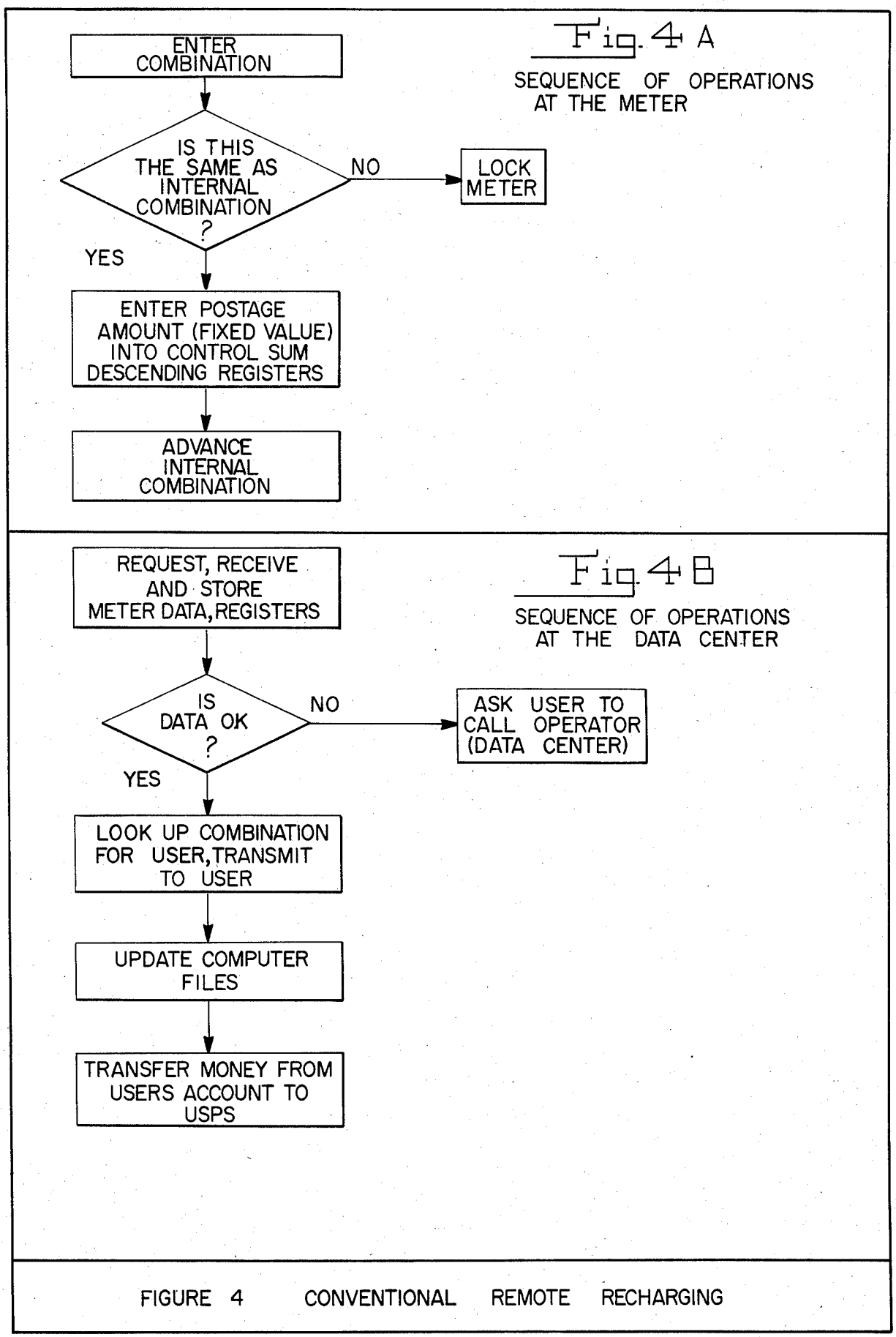

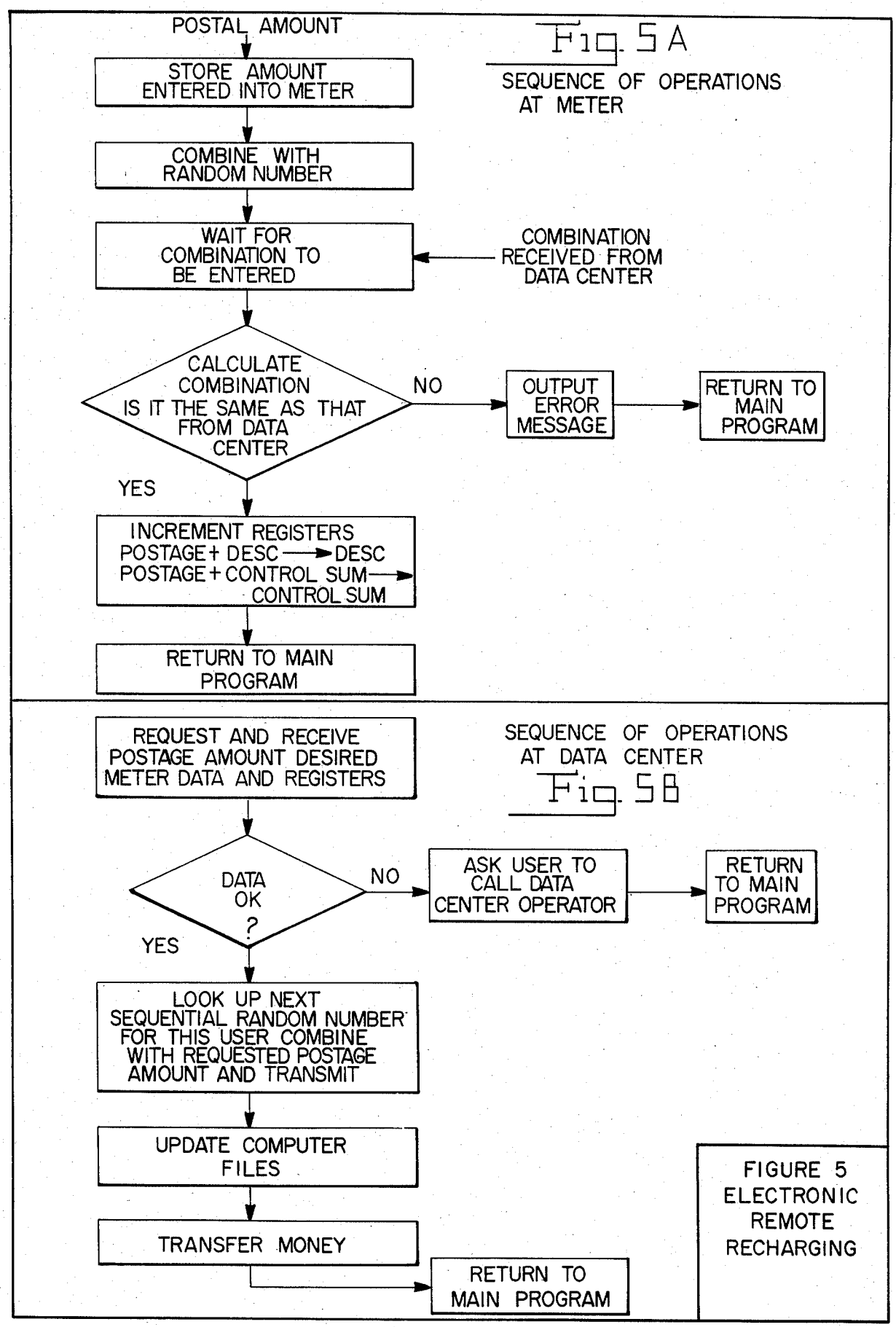

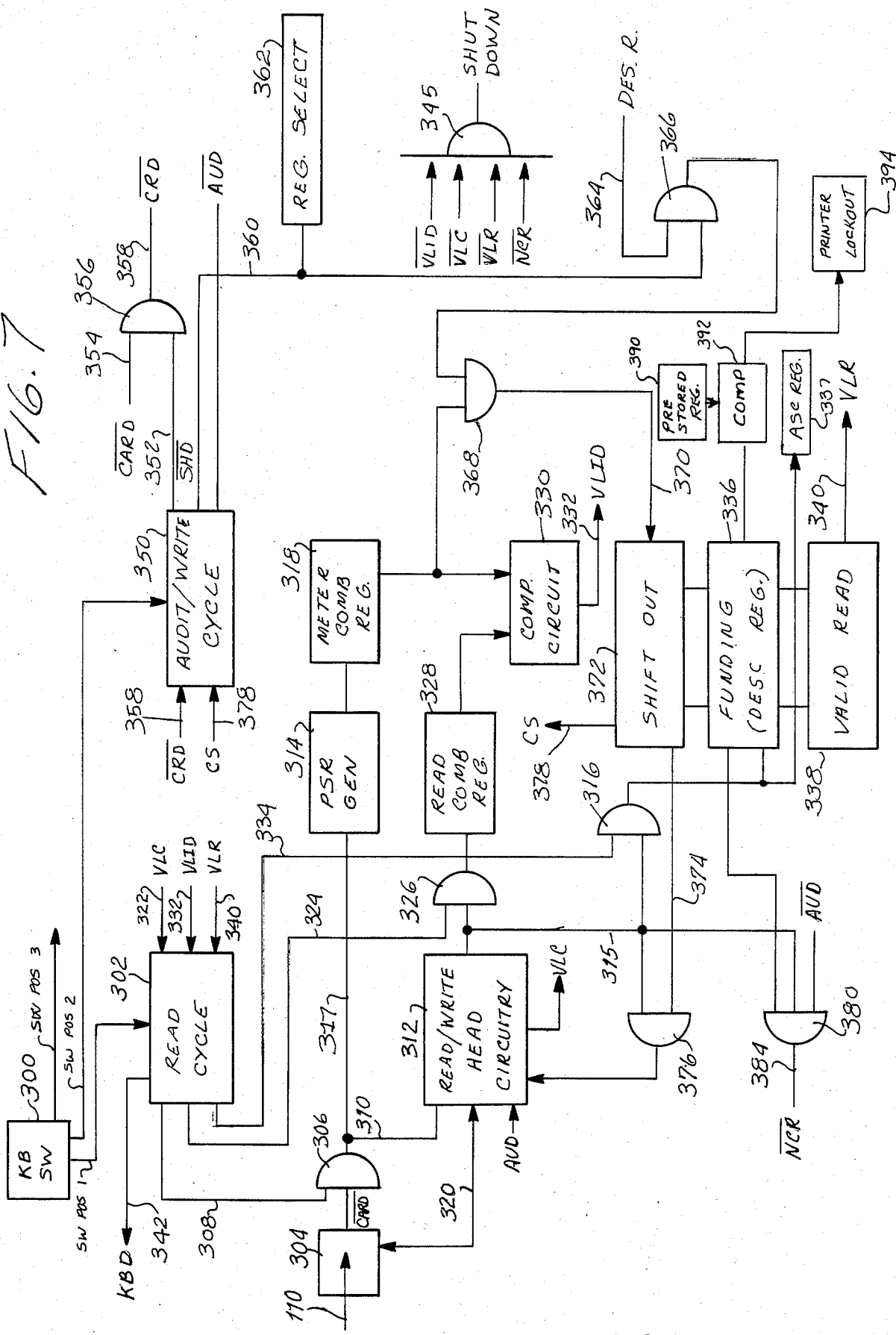

ELECTRONIC POSTAGE METER SYSTEM SETTABLE BY MEANS OF A REMOTELY GENERATED INPUT DEVICE

BACKGROUND OF THE INVENTION

This invention relates to electronic postage meter systems and more particularly to an electronic postage meter system settable by means of a remotely generated input device.

Many attempts over the past few years have been made to provide postage meter systems which may be remotely settable. More particularly, it has been considered desirable to have a postage meter system which does not require carrying the postage meter to the Post Office for periodically charging or requiring a postal official to come to the meter location for recharging the meter. Several earlier attempts to provide remotely settable meters are noted in U.S. Pat. No. 3,194,946 to Rabinow, wherein a punched card is placed into a mechanically readable meter for the purpose of charging the postal meter to a desired postal setting. In U.S. Pat. No. 3,716,698 to Simjian, a magnetically readable card is provided for the purpose of recording postage. In both of the systems however, the aspects of security, that is to say the ability to create a falsified card, is too easily overcome for either of these devices to be practical.

Furthermore, modern technology has given rise to the microcomputerized postal meter. An example of such meter will be found in U.S. Pat. Nos. 3,938,095, and 3,978,457, both assigned to the assignee of the present invention. A further example of the use of computerized systems for receiving fixed incremental amounts for recharging over a data link or other remote transmitting device is shown in U.S. Pat. No. 3,792,446. The receipt of the variable amount by means of a remote data link is shown in U.S. Pat. No. 3,792,446. In these latter cases, the problems of security are minimized by virtue of a technique for providing uniquely coded identification signals which cannot be falsified by the user.

In U.S. Pat. Nos. 3,800,284 and 3,860,911, a security system is provided for an electronic lock wherein unlocking combinations are generated by two separate units in a pseudo random manner. In the concept of pseudo random generation, the relationship between successive generated numbers from a pseudo random generator cannot be detected intrinsically from an examination of the numbers themselves. The phrase "pseudo random" is employed only because two separate generators, constructed in the same manner (using the same internal algorithm, for example) will generate the same sequence of random numbers. Using this concept, a secure locking system can be provided wherein an electronic lock is constructed with a key- or card-operated input device, prestored combinations being placed upon the card in accordance with the pseudo random generation concept. In this manner, the remote lock can be provided with a similar pseudo random generator, which upon a match between itself and the key or card being inserted therein, will recharge by adding postage to describing and presenting registers and will advance the generator to the next combination. These concepts are fully described and disclosed in the aforementioned U.S. Pat. Nos. 3,800,284 and 3,860,911, assigned to the assignee of the present invention. By the use of such a unique recognition feature, the security aspect essential to the employment of a remotely settable postage meter may be realized.

In addition, besides the remote charging function, the use of the unique identification code provides certain other features which may be employed by a postal meter system such as described hereinabove. Thus, the use of such a card may be employed not only to charge the meter but to read the current state of the registers internally in a remote meter for the purposes of audit. The postal meter in this fashion provides a unique combinational code indicative of the meter to prevent falsification, along with such features as the date of the audit, verification that the audit data is from a specific meter, and assurance that data has not been falsified. The provision of a unique digital signature on an audit card representative of a remote postal meter thus is an essential feature to the provision of an audit function in a remote meter reading device with high security aspects.

It is therefore the prime object of the present invention to provide a secure electronic microcomputerized postal meter remotely chargeable by means of a user-transported device.

It is a further object of the present invention to provide a microcomputerized postal meter employing a prerecorded card for the purpose of charging the meter in a secure fashion.

It is a still further object of the present invention to provide a microcomputerized postal meter with an audit function, enabling the postal meter to dump the contents of any selected internal register in a unique and cryptic manner onto a user-transportable card.

SUMMARY OF THE INVENTION

The foregoing objects are realized in accordance with the present invention wherein an electronic postal meter system is provided having a postal meter including postage printing and an accounting means for maintaining an accurate record of an amount chargeable to and used by the printing means, and wherein a data entry means for entering an amount to be charged is removable from the postal meter system, the data entry means having encoded thereon a unique combinational code charging the accounting means, and a locking means contained with the postal meter system which is responsive to a predetermined level within the accounting means for locking the means from further operation. The data entry means can be a card, previously recorded with encoded data in accordance with a pseudo or truly randomly generated combinational code recognizable by the meter for the purpose of recharging the meter. In addition, the meter can be provided with an audit function which, when operated by the user, will act to place the contents of any selected register, such as the descending register, onto the data entry means for the purposes of enabling central authority to audit the contents of the meter.

Basically, a card entry system provides a single pass system where the magnetic card is read once, checked for validity of data and, if valid, the proper registers are incremented. The card is now erased and no longer used. Because of the unreliable nature of the card (as compared to standards applied to semiconductor components), this is a preferable manner of inputting data. Error checking and/or correction can be used to minimize problems.

A further use of a magnetic card is to conduct audits whereby meter data is recorded on the card in a manner not subject to falsification. This would reduce the requirements in physically bringing the meter in for an audit, allow for more frequent audits, and allow using a computer to perform the audits.

A multipass concept using a magnetic card provides all the meter registers on the card in encrypted form. The meter printer and logic read the card, check for the proper combination, decrypt the registers, update the proper registers by the postage amount, print, encrypt the registers, update the combination, and rewrite on the magnetic card. The user could alter the card but since it is in encrypted form, it would not be possible to alter it such that certain consistency checks would not be able to pick it up and reject the card. The non-volatile memory requirements in the meter go down to that required for its combination algorithm.

A further alternative is an electronic card containing the memory registers (i.e., in non-volatile memory semiconductor form) and a random number generator comparable to one in the meter printer. The meter registers are now detachable from the printer. When one wanted to print, the printer would send a signal to the memory card representing the postage amount. This would be combined with a combination generator giving a resultant combination to the printer. The printer would similarly have generated the number.

Upon a match, an enabling signal is generated which allows the meter to print. The register updating is done in the memory module.

Previously, the accounting means were housed with the printing means for security. This invention allows accounting to be separated from printing while still allowing security.

In a further embodiment, the data entry means itself comprises the descending register of the meter and, when in place, senses and monitors the use of the meter until the balance of the encoded dollar amount reaches the predetermined level at which time the meter becomes locked and the information encoded on the card related to security aspects destroyed while the encoded information related to accounting retained for other record purposes.

Additional security means can be provided wherein the card is locked into the machine in the event of an incorrect reading of entry combinations, and wherein the card information is immediately erased upon being transferred into the appropriate registers within the postal meter system.

The postage meter employed by the present invention utilizes a central processing unit, plurality of memory units, multiplex input and output, and postage setting means responsive to the controlled interactions between the CPU, memory inputs and outputs, for setting predetermined postage and printing the postage as desired. The meter is built up about a plurality of integrated circuit components and may employ LSI or VLSI technology to provide a functional relationship enabling the postage meter system to accomplish its objectives.

In general configuration, a central processing unit for providing the data flow control and for providing calculation of postage in accordance with input supplied thereto is employed. Coupled to the CPU is a permanent memory for storing postage data program, and is a non-alterable storage medium. A temporary memory is also provided for storing and forwarding working data in accordance with the operation of the CPU. Input to the postage meter is provided by means of an insertable card, containing thereon both encoded or encrypted information along with encrypted data for charging the postal meter. It will be understood that the data may include a unique identification code for the meter, or may include only a secured combinational aspect for purposes of recharging the meter.

A non-volatile memory is intercoupled with the CPU and provides a permanent or non-destructive storage location for postage funding data in accordance with the transfer routine previously established and activated in accordance with a shut-down or start-up sequence of the system. The use of a non-volatile memory is important in that data which is significant in the system, such as the contents of descending registers which keep track of the remaining balance in the postage meter or ascending registers, which keep track of the continuous accumulation of charges thereto, is permanently stored in the non-volatile memory when the system start up, the data from the non-volatile memory is tranferred back into the temporary memory.

Further interaction with the CPU is provided by means of an appropriate input device such as a keyboard which provides the appropriate postal data to the CPU for the calculations to be performed. An output or display, which is multiplexed, also interfaces with the CPU for displaying data from the temporary storage in accordance with the commands. The ultimate output of the CPU is coupled to a postage setting mechanism which sets the amount of postage to be printed into a postal printing unit for printing the postage as desired.

More specifically, the microcomputerized postage meter of this invention may be built upon the MCS-4 ® microcomputer, a product of Intel Corporation, Santa Clara, Calif. It will be understood that other manufacturers and equivalent components may be employed and that Intel components are used for purposes of example. The microcomputer set is of LSI design, and comprises a central processor unit (CPU-4004), which performs all control and data processing functions, and contains the control unit and arithmetic unit of a general purpose computer. The computerized meter comprises a plurality of ROM's (Read Only Memory Chips—4001) and a plurality of RAM's (Random Access Memory Chips—4002) which are interconnected to the CPU. The ROM's contain the postage system program. One four-bit input or output port is provided on each ROM package. One four-bit output port is provided on each RAM package.

The computerized meter also contains shift registers (Intel number 4003) for port expansion and multiplexing capability, and associated circuitry including clocks, power supplies and interfacing circuits to connect with the outside world.

The postage printing mechanism is one of several peripheral components including a keyboard for instructing the meter, and a display for visually monitoring the system's functions.

The postage printer of the meter is a modified Model 5300 postage meter manufactured by Pitney-Bowes, Inc., Stamford, Conn., such as disclosed in U.S. Pat. No. 4,050,374, assigned to the assignee of the present invention, the disclosure of which is incorporated by reference herein. The mechanical accounting means (ascending and descending registers) have been removed from the meter along with the actuator assemblies and setting levers. The remaining printer is preferably set by a pair of stepping motors. The mechanical operation of the printer is monitored by a plurality of photocells strategically placed within the printer housing. When a particular function of the printer fails to be performed, a photocell monitoring that appropriate function will provide an error input to the system via an input port.

The microcomputer meter also receives inputs from the keyboard and non-volatile memory through an input port.

Outputs from the meter are generally handled via the shift registers and output ports.

Peripheral devices may easily be added to the meter, such as a large external display, a receipt printer, or a listing printer, etc.

DESCRIPTION OF THE FIGURES

FIGS. 4A and 4B are flow chart routines and subroutines implementing a conventional remote charging meter wherein FIG. 4A shows the sequence of operations at the meter while FIG. 4B shows the sequence of operations at the data center;

FIGS. 5A and 5B are flow chart routines and subroutines implementing an electronic remote charging meter wherein FIG. 5A shows the sequence of operations of the meter while FIG. 5B shows the sequence of operations at the data center;

FIG. 7 is a logic diagram illustrating the inter-relationship of certain logic components implementing the flow chart of FIG. 4;

DETAILED DESCRIPTION OF THE INVENTION

Figure 1:
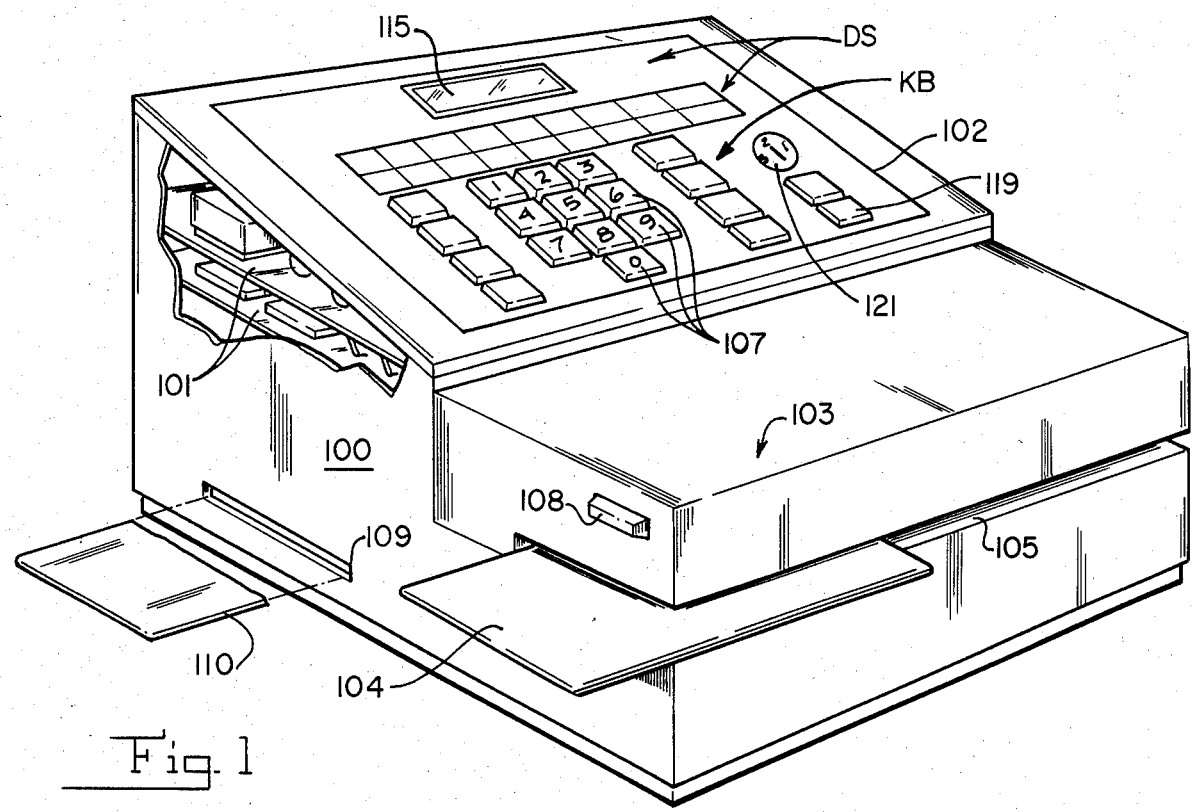
FIG. 1 is a perspective view of the housing for the computerized postage meter.

Referring to the figures, FIG. 1 shows a general housing arrangement for the card reading meter system of the present invention. A housing 100 contains modular plug-in circuit panels 101 containing the circuitry and the CPU, ROM's, RAM's and shift registers of the meter. The keyboard KB and the display DS are mounted on the common top panel 102 of the housing 100. The setting and printing mechanism is contained in a forward section generally shown by the arrow 103. An envelope 104 which is to be printed with postage is introduced in the slotted portion 105 of the meter section 103 after the meter is initialized. The amount of postage to be printed is then keyed into the keyboard KB via pushbuttons 107. The set button 119 is pushed to set the postage into the printing drum, and the print button 108 depressed. The print button 108 may be replaced by a limit switch or optical sensor located in slot 105, which would automatically provide a print signal when an envelope enters slot 105. Also provided, in accordance with the invention, is a slot 109, adapted to receive a card 110. As will be described in further detail below, the card 110 contains thereon or therein information relating to the identity of the meter and the amount of postage to be charged therein.

Figure 2A:
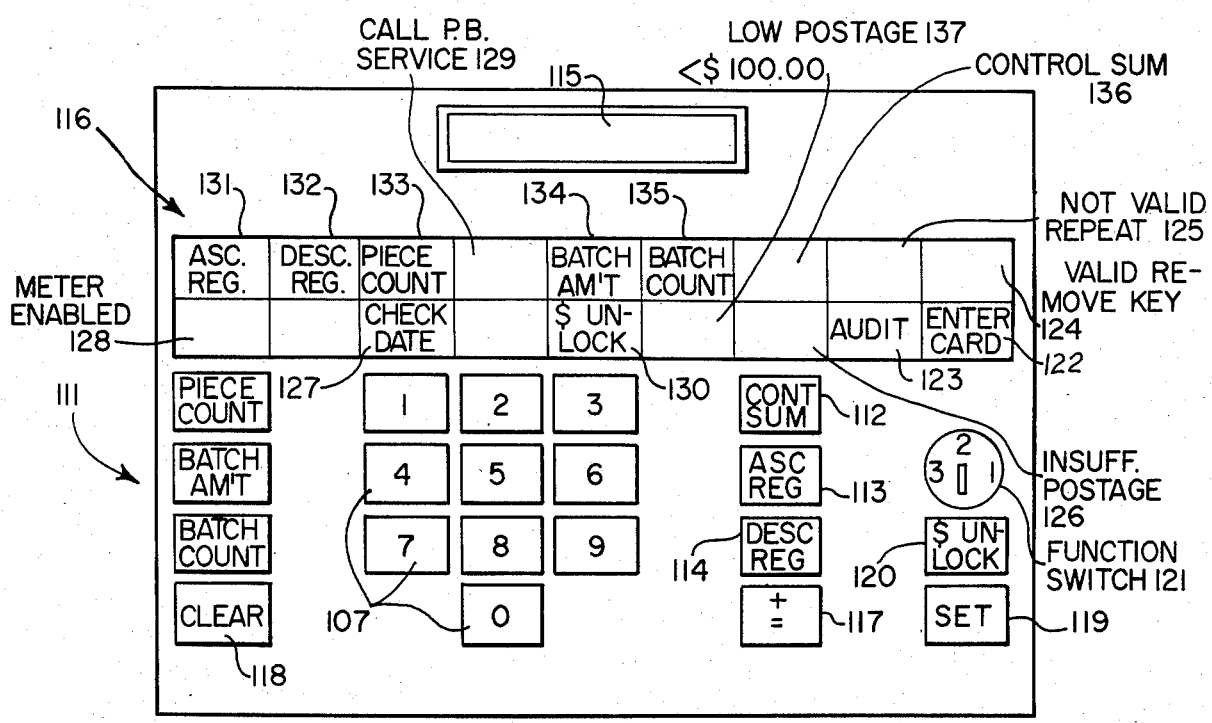
FIGS. 2A, 2B and 2C are enlarged plan views of the keyboard and display shown in FIG. 1.

FIG. 2A is an enlarged view of panel 102 of FIG. 1, and shows the keyboard KB and display DS of the postage meter. The key-board comprises pushbuttons 107, as noted above, for entering the numerical amount of postage desired into the system. Pushbutton 111 generally refers to the electronic registers for piece count, batch amount and batch count, respectively. Additional pushbuttons 112, 113 and 114 provide for control sum, ascending register and descending register, respectively. When any one of these buttons are depressed, the numerical section 115 of the display DS is cleared and the appropriate register indicated by the depressed button is loaded into the display. The appropriate indicator lamp section 116 of the display is lighted to provide the operator with information confirming the presence in the display DS of the appropriately selected register. The batch count and batch amount register supply running accounts of the total number of pieces of mail processed during any one run or time period, and the total postage expended for this mail. These can be reset to zero by the user. The control sum register is extremely useful in that it provides a check upon the descending and ascending registers. The control sum is a running account of the total funds being added into the meter. The control sum must always correspond with the summed readings of the ascending and descending registers. The control sum is the total amount of postage ever put into the machine, and is alterable only when adding funds to the meter. Generally, mechanical meters are not resettable by the user but only by the postal authorities. However, with electronic postage systems, such as provided by the present invention, a remote resetting capability is feasible in accordance with the operation of the meter. A construction of the present meter for programming in accordance with remote recharging by virtue of telephone links, as was discussed above, is shown in U.S. Pat. No. 3,792,446, and assigned to the assignee of the present invention for fixed charging, and U.S. Pat. No. 4,097,923, also assigned to the assignee of the present invention, for remote resetting of a variable amount of postage. The entire disclosure of both of the said U.S. Pat. Nos. 3,792,446 and 4,097,923 are incorporated herein by reference. The piece count register differs from the batch count register in that it is not resettable by the user, and is used to indicate the total number of postage printings (pieces of mail) that the machine has experienced. This information is useful for ascertaining the life of the machine, to gauge when the system may require servicing and maintenance, and is also useful in audit procedures.

The ascending and descending registers operate in normal fashion as might be expected from a standard postage meter. The ascending register gives a running total of the printed postage and the descending register informs the operator of the amount of funds still remaining in the postage system.

The +/=key (pushbutton 117) provides the function of addition for adding any special charges to postage such as special delivery, certified mail, etc.

The clear key 118 clears a numerical display 115 and also sets the batch registers to zero if either one is displayed at the time the clear key is actuated.

The set button 119 is depressed after the postage required to mail a letter is keyed in by the buttons 107.

The set button 119 causes the print wheels in the printing mechanism to be set to the desired postage.

The dollar unlock key 120 is a precautionary button which must be depressed by the operator in order to set postage equal to or in excess of a dollar.

The need to add funds to the meter system is signaled by indicator lamp 126.

Funds are added to the meter by obtaining appropriate funding via an insertable card 110, as will be discussed in more detail hereinafter.

A key may be inserted into the key way of a lock type function switch 121. The switch is free to turn to first position 1, and an indicator light 122 instructs "Enter Card". Card 110 can then be inserted whereupon it is read: the combination is checked for correspondence to an internally generated number corresponding to the requested amount of postage. Should agreement occur, lamp 124 (valid) lights, the funding is displayed in display area DS and the operator is free to run the meter. If no correspondence is found, lamp 125 (not valid) lights, indicating that the card contents have not been accepted.

A position 2 is also present on function switch 121. When switched to this position, audit lamp 123 lights in the display area and a card 110 is entered into the side of the meter. Register data, perhaps in encrypted form to prevent falsification of meter data, is recorded upon the card. This card can be mailed to the Post Office for audit purposes.

A position 3 can be used, similar to 2, but with factory maintenance data recorded upon the card.

A check date reminder is provided by the indicator lamp 127 each time the postage meter system is turned on.

A meter enable indicator 128 lights when (a) printing drum is properly set with postage; (b) the postage to be imprinted is displayed; and (c) sufficient funds are available to imprint the postage desired.

The indicator lamp 129 signals the operator to call the Pitney Bowes Service Department. This indicator lights when there is something wrong in the system, e.g., the sum of the ascending and descending registers do not check with the control sum.

The indicator lamp 130 signals the operator that the postage to be set is over or equal to one dollar and in order for the postage to be set the dollar unlock button 120 must be pressed prior to the set button 119.

The indicator lamp 131 shows that the ascending register contents are being displayed in display section 115.

The indicator lamp 132 lights when the contents of the descending register are being displayed in the display section 115.

The piece count indicator lamp 133 lights when the piece count is being displayed in display section 115.

The batch amount 134 and the batch count 135 indicators light when the batch registers are being displayed. The data is shown on the display 115 for the batch count as a whole number since the information is similarly displayed without decimal points. The control sum indicator 136 lights when the control sum register is being displayed in display section 115.

The low postage indicator 137 lights to tell the operator that the remaining funds in the descending register are currently below a predetermined amount. This alerts the operator that the meter will need to be recharged soon. A second minimum may also be established which locks the port mechanism to prevent further operation.

Figure 3:
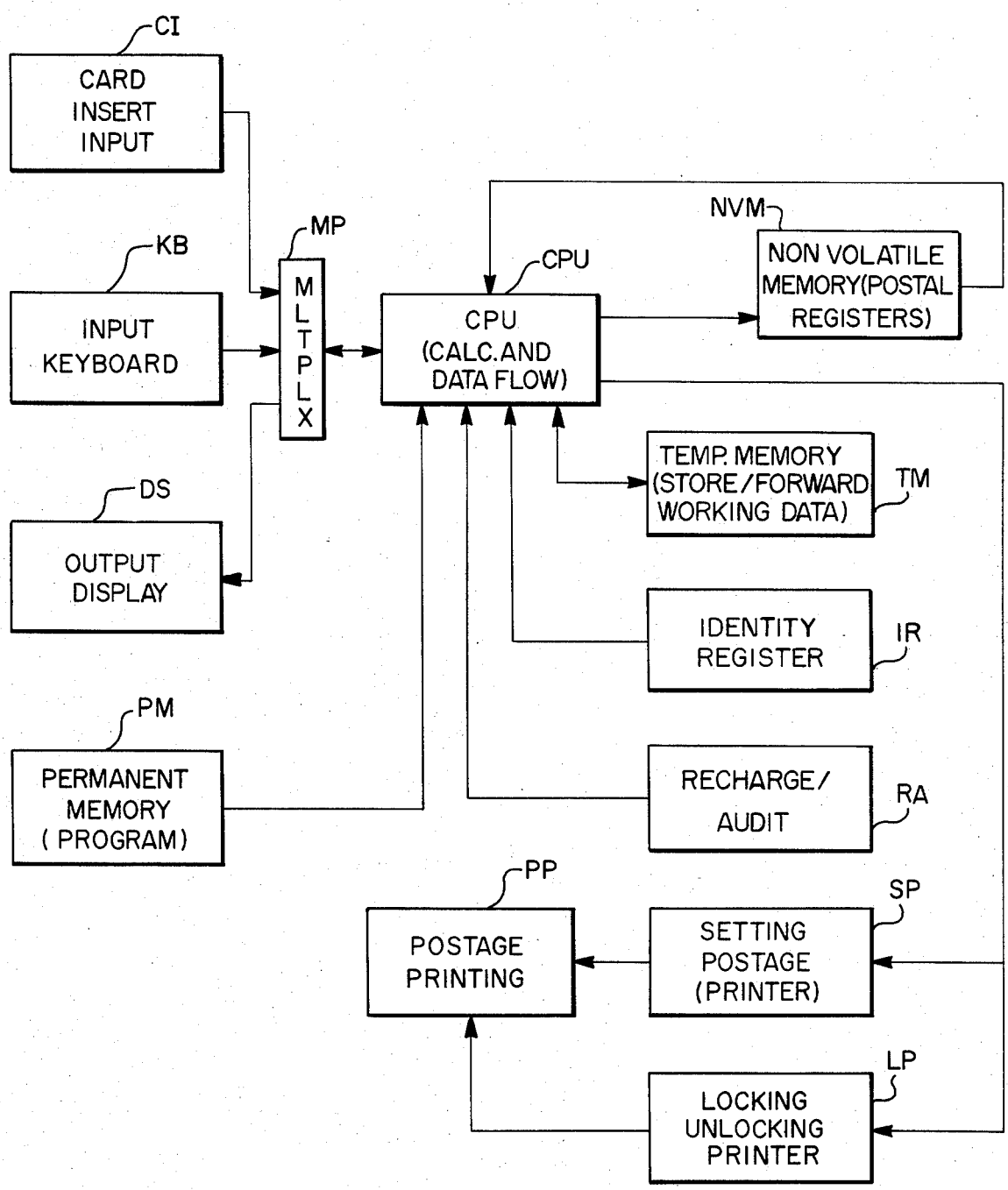
FIG. 3 is a functional block diagram of a microcomputerized postal meter of the present invention.

Referring to FIG. 3, a schematic block diagram of a meter funding system employable in conjunction with this invention is illustrated. As was described in conjunction with the fixed and variable charged meters, the heart of the system is a CPU performing two basic functions: performance of calculations based on input data and control of the flow of data between various registers and memory units. Three basic memory units are employed in conjunction with the CPU.

The first is the permanent memory PM, which is a non-alterable memory storing a specific sequence of operations for performing postal data calculations in accordance with certain predetermined inputs as well as performing other routines for operating the system. The second memory unit is a temporary memory TM which interacts with the CPU for forming a temporary storage, holding and forwarding working data in accordance with the calculations being performed by the CPU. An additional memory component NVM is also coupled to the CPU and performs a storage function which is very significant in the system operation of a postal data system. The NVM is a non-volatile memory which acts to store certain critical information employed in the postal system as part of a predetermined routine activated either upon shut-down or start-up. This routine may be located in the permanent memory and is accessed by an appropriate sensing device sensing either of the two stated conditions, shut-down or start-up, for operating the CPU in accordance with that routine. The function of this routine is to take information stored in the temporary memory TM which represents crucial accounting functions such as descending balances or ascending credits and the like and store them in the NVM (non-volatile memory) wherein they may be held while the machine is de-energized and recalled upon a subsequent start-up. In this manner, the computer system may continually act upon these balances in the temporary memory without fear of loss of this information upon shut-down. Further, the information may be recalled on reactivation by start-up by retrieving it from the non-volatile memory NVM and feeding it back into the TM via the CPU. The non-volatile memory is shown as coupled to the CPU and deriving an output therefrom in accordance with the transfer of information from the temporary storage TM under the control of the permanent memory PM through the CPU in accordance with the shut-down routine. The NVM unit is also shown as providing an output line coupled back into the CPU for transferring the data back into and through the CPU and into the temporary TM in accordance with the start-up routine under the control of the permanent memory PM.

The system operates in accordance with data supplied from an appropriate input means CI or KB. This data is fed into the CPU under control of the program in the permanent memory. At any time during the operation of the system, should the contents of the temporary memory storing the appropriate credit, debit, balances, or other accumulations in accordance with the various features of the system be desired to be displayed, an appropriate instruction provided by the input means KB causes the CPU to access the desired location TM storing the information requested. The information is provided through the CPU into the output display unit DS. The input and output units may be multiplexed by a multiplex unit MP to and from the CPU.

Under control of the CPU when appropriate postal data information is provided from the input KB, and all of the conditions such as limits and the like which may be preset in accordance with the entered data in storage in the temporary memory TM, are satisfied, a postage setting device SP will respond to an appropriate output signal from the CPU enabling a postal printing unit PP. At this point, the system has now accomplished its immediate function of setting the postage printer and enabling the printer to print postage.

Before proceeding to a more detailed description of the operation of the present invention, it is useful to make a comparative study of conventional remote charging meters and electronic charging meters. With reference to FIGS. 4A and 4B, a flow chart of conventional remote charging meters is illustrated. The functions stated therein are believed self-explanatory. As with conventional flow chart terminology, the rectangular blocks represent functional blocks while the diamond-shaped blocks are decision blocks. Implementation of logic in accordance with functions and decision blocks set forth in flowcharts may be effected in conventional microprocessor technology through the use of standard programming languages. FIG. 4A refers to the meter flowchart arrangement, whereas FIG. 4B illustrates the operation of the data center. In FIG. 4A, the meter user enters the combination and the meter performs a comparison to determine whether the stored entered combination is the same as the previously stored internal combination. If not, the meter is locked and use prevented. If it is, a predetermined amount of postage is entered into the control sum and descending registers, and the internal combination advanced to the next combination in accordance with the prestored meter sequence. At the data center, the register and meter data is stored, entered and checked to determine validity. If the data is valid, the user combination is retrieved, transmitted to the user, the file updated, and funds transferred from the named account to the Postal Service account.

With reference to FIGS. 5A and 5B, the electronic remote meter reading concept is set forth. In this sequence, FIG. 5A, the meter sequence is shown, the postal amount is entered and stored, and combined with a random number generated from within the meter. The meter then waits until the combination is entered on the keyboard and determines whether the calculated combination is the same as that entered. If it is not, an error message is outputted and the sub-routine returned to the main program. If it is, then postage as charged is entered into the descending register. In addition, the postage is added to the control sum. The sub-routine then returns to the main program. At the data center, FIG. 5B, a user enters the requested amount desired, register data and meter data. If the data checks validly, a random number is generated and combined with the requested amount. This number is then transmitted and the files updated. Funds are transferred and the program then returns to the main data sequence. It should thus be noted that two essential concepts for random number generation are set forth. In conventional remote charging, a pseudo-random number generated sequence is provided both at the data center and in the meter. The term pseudo-random is employed because the random numbers are generated by the two units are random with respect to successive numbers, but are predictable in the sense that the two random number generators will generate the same sequence of random numbers. Thus, the meter will recognize appropriately entered combinations due to similarity with the combinations generated by the data center generator. In a variation of the present invention, where only a single random generator is employed, it can be truly random. Since only a single generator is employed, it is employed at the data center. It is the meter which is now capable of interpreting the combination and determining its validity.

As part of the unique aspect of the present invention, the additional input identified as the card insert input CI (FIG. 3) is interfaced through the multiplexer MP to the CPU. This unit is adapted to interface bi-directionally with the multiplexer for the purpose of providing information and receiving information from the postal meter system as was described hereinabove. In addition, the postal meter includes an identity register IR which responds to the appropriate input from the card unit CI for retrieving from the permanent memory PM a digital signature corresponding to the identity of the particular meter. For purposes of security, the digital signature may be scattered in various locations throughout the memory in terms of a sequence of addresses. In addition, for additional security, the identity register may include a pseudo-random number generator which acts upon sensing the digital signature for converting it into a pseudo-random number combination (changes upon every access). The matching digital signature to which the inputted card in the card input unit CI is to respond also contains the same pseudo-random number in accordance with a combinational code generated at the postal station. An additional logic block RA is provided for the purposes of accomplishing the recharge and audit functions in conjunction with the encoded instructions provided from the card input CI. The functions of this unit will be explained in further detail below.

There are at least three types of generators that might be useful in a postal meter:
1. Pseudo-random sequence.
2. Encryption algorithmic sequence.
3. Random Process Sequence.

The first two are algorithmically generated. An advantage of this technique is that with a few bytes of data in non-volatile memory as seeds for the algorithm, plus some program memory, very long sequences may be implemented. Each element may be generated independently in the meter card data center as required. Since an algorithm is employed, it can be theoretically "crashed", practically it can be made very secure.

The random process sequence, however, cannot be generated simultaneously as required in two separate locations. Thus, it must be generated, then written into both data center memory and postage meter, in order to have two corresponding sequences. This can require a fair amount of memory, but can be very secure. The development of large capacity inexpensive magnetic bubble memory makes this technique practical. Memories are available with up to 256,000 bits of information which would be sufficient for thousands of meter combinations.

The principal difference between conventional remote recharging and variable remote recharging is the capability of the meter logic to combine an entered postage amount with the next sequential combination to generate a resultant combination which is a function of postage amount to be added. Since the data center utilizes a general purpose computer, the capability for either remote recharging system is inherent on the data center end.

The two basic functions to be provided by the use of a card insert input in accordance with the present invention involve charging of the postal meter and auditing of the appropriate registers of the postal meter. One final function as illustrated in FIG. 3 is the print lock block LP. The print lock block LP responds to an appropriate signal from the CPU indicating proper satisfaction of the various conditions in terms of both in identification, charging, audit, inputting of postage, etc., for the purpose of unlocking the postage printing block PP.

The components illustrated in FIG. 3 may be constructed of suitable LSI integrated circuitry currently available for various manufacturers. A complete description of a system from effecting the fixed and variable postage charging concepts utilizing a microcomputer set of chips is fully described in U.S. Pat. No. 4,097,923, assigned to the assignee of the present invention, and the disclosure which has been incorporated herein by reference. As described therein, an MCS-4 microprocessor, manufactured by the Intel Corporation, Santa Clara, Calif., is utilized in order to effect the operations set forth in that disclosure. Similarly, the same components may be utilized in the present invention, as may any of the more recently issued microprocessors, such as the Intel 8080, the Intel 8085, or the Z80, available from the Zilog Corporation of Santa Clara, Calif. The use of ROM chips for the permanent memory and the use of RAM chips for temporary memory similarly are state of the art components, described fully in the aforementioned U.S. Pat. No. 4,097,923. The non-volatile memory may consist of a battery back-up memory or any of the newer memory components which will maintain their electrical properties after entry of information without any requirement whatsoever for power systems. It will be understood that the term "nonvolatile" is intended in this context to refer to a memory system which does not require an externally applied source of energy at least for a sufficient time period, and is meant to include systems either employing a local battery for energization or the more modern memory components, such as MNOS memory chips, magnetic bubble devices, or the like, and utilizing means for permanently storing information which is then electrically alterable at a later stage.

The printing system employed with the present invention is a modified Model 5300 postage meter, manufactured by the assignee of this invention, Pitney Bowes, Inc., of Stamford, Conn. Modifications necessary to the 5300 meter are fully disclosed in the aforementioned U.S. Pat. No. 4,097,923. It will not be repeated herein. The interfacing between the microprocessor and the modified postal meter, described in the aforementioned U.S. Pat. No. 4,097,923, applies with equal force to the present invention. It would appreciated by those skilled in the art that the improvements made with respect to the present invention vary from the device set forth in the aforenoted U.S. Pat. No. 4,097,923, in the manner which is fully explained in the present specification.

In a secure postal system, the concept which has been found successful in operation is the use of two separate but matching kinds of information to effect access. This matching information, complementary combinations, are discussed in the aforementioned U.S. Pat. Nos. 3,792,446, and 4,097,923. As discussed therein, the meter recharging systems employ two combination generating machines: (a) a digital computer located at a data center, and (b) one or more remotely located electronic postage meters. Each of these two machines exists to generate a combination, each being the match of the other, and thereby allowing postage meter users to refund or recharge their postage meters. This is done without the inconvenience of physically having to transport the meters to postal authorities. In the aforenoted U.S. Pat. No. 4,097,923, the system operates by means of providing the combinational number data by a data link, such as a telephone, directly to the operator. The operator then enters the number on the keyboard. In the function of the present invention, the intervening operator is eliminated. Within the concept of the present invention, the operator or user of a postage meter refunds his meter by obtaining from the data center, either directly or by use of the mails, a card which will contain thereon certain information enabling the user to recharge his meter. The card is inserted into its appropriate slot on the meter and the meter is activated by means of the switch and lock on the front panel of the meter. On activation, the meter reads the identification portion of the card and confirms that the card is correctly applied to the machine to which it has been designated. Upon a satisfactory completion of the identification procedure, the machine next operates to read in the charging information which will provide the increment of charge to the meter which the user desires. At the same time as a satisfactory completion of charging data is effected, the meter automatically operates to erase the card, and thereby prevent its further use. Although the card cannot be re-used as a new combination is required, it is best to erase for security reasons. A mechanical interlock may be built into the system to inhibit removing the card until the charging procedure is completed and the card has been erased. When the user later desires to recharge the meter, an appropriate key is activated on the keyboard, at which time the status of the registers in the meter along with a proper identification code is re-recorded on the user's card. The user can then take this card back to the postal authorities where it is reset with the new set of data and the cycle repeated.

Other advantages of the system will be apparent. Auditing procedures may be accomplished merely by the insertion of a card and activation of the recharge or audit cycles. In this way, the status of all of the internal registers of the meter, or any selected register, may be recorded onto the card for later confirmation and audit procedures.

As will be described further below, the card itself may employ magnetic strip and conventional magnetic recording techniques for reading and erasing, or, alternatively, the card may be a base enclosing several of the registers themselves. Since the cost of semiconductor registers has reached a relatively low level, a circuit card may alternatively be used as a cartridge case including several semiconductor components which can be charged into the slot on the side of the postal meter panel for effecting the various operations discussed above. The cartridge, somewhat in the nature of cartridges conventionally used in video games, includes the necessary semiconductor components and interfaces with and can be powered from the basic postal meter circuitry itself.

Figure 2B:
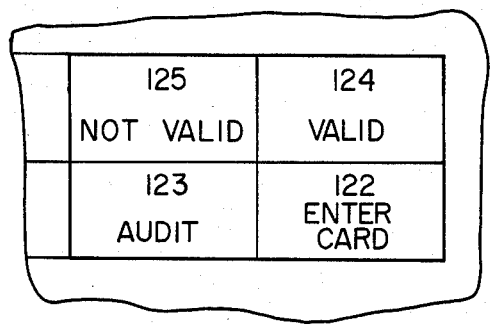
Figure 2C:
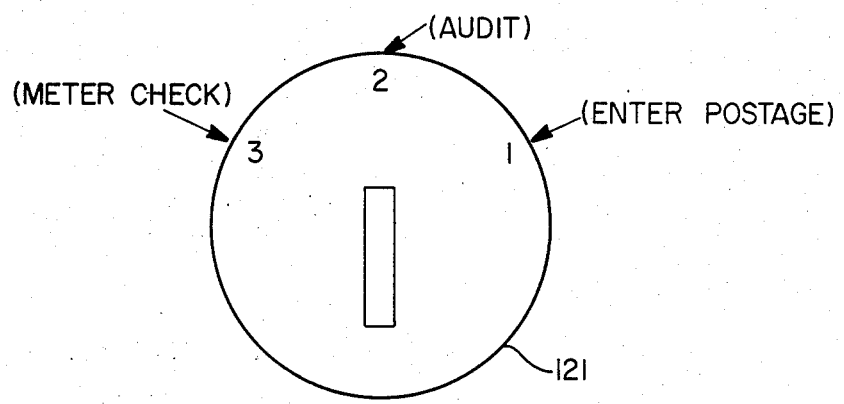
Figure 6A:
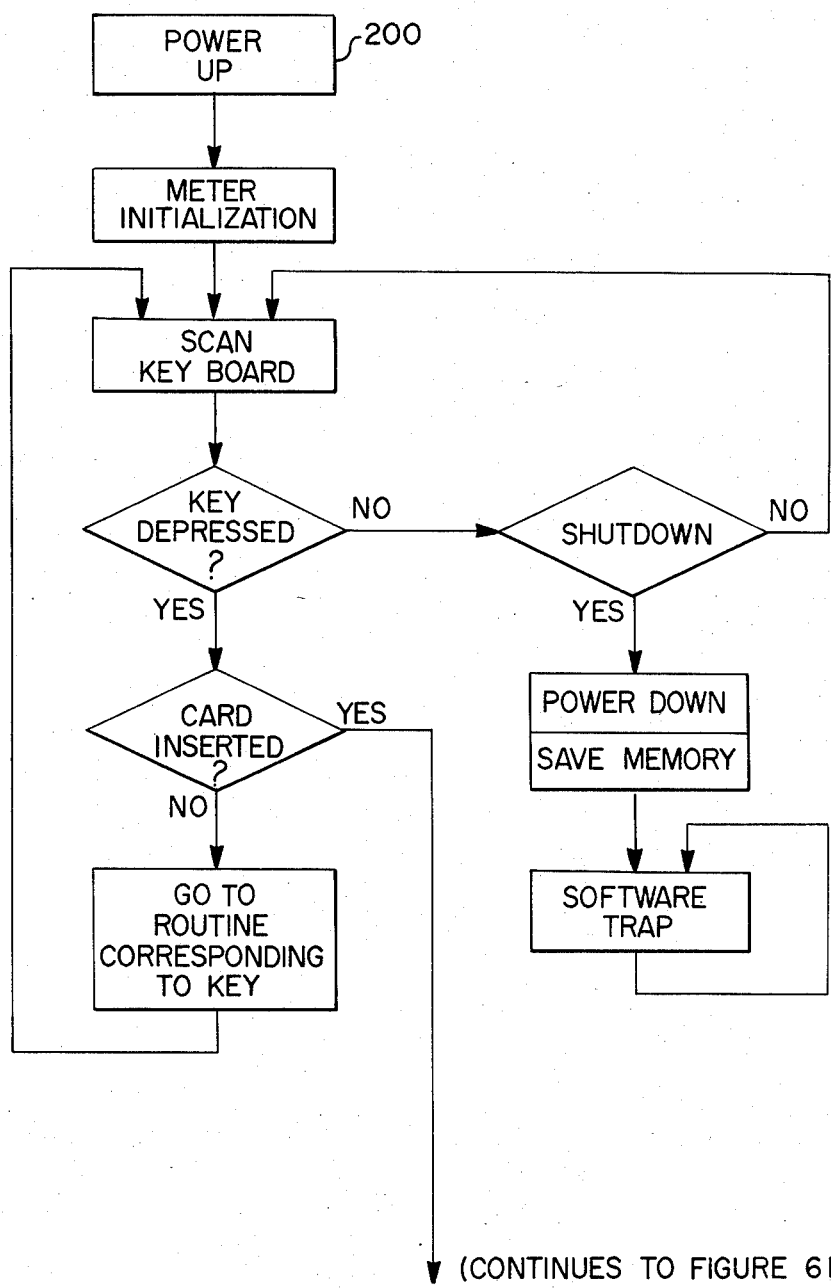
FIGS. 6A and 6B are each flow chart routines illustrating the operation of the present invention.
Figure 6B:
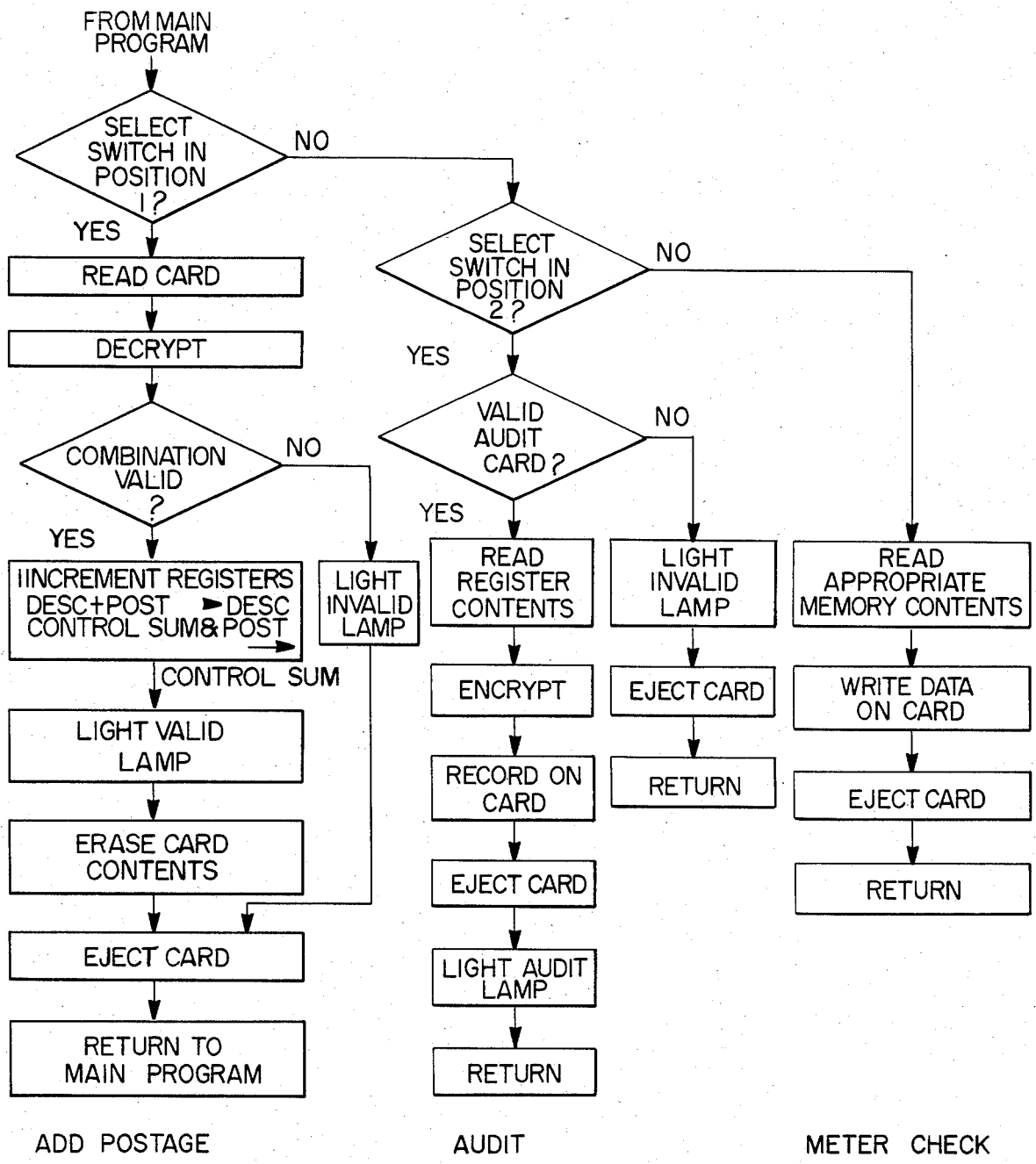

Referring now to the flowchart shown in FIGS. 6A and 6B, the scanning process proceeds as in the previous description of the electronic postage meter. The key switch 121 specifies the particular mode the meter is in and enables the card entry slot 109 by operating a solenoid 420, shown in detail in FIG. 8, and described in further detail below. Insertion of a card 110 initiates program action to perform the functions which are indicated by the selection of the key switch 121. In conjunction with the key switch or by appropriate means not shown, the meter is placed into a power-up condition, indicated by the first block 200 in FIG. 6A. The power-up condition results in lighting of the meter enabled lamp 128 on the face of the meter. The power-up provides for meter initialization, which may include various steps such as clearing and resetting of all the registers, and effecting all the usual housekeeping functions necessary to place the meter in its initial operative condition. Switching of the function switch 121 to position 1 results in the generating of a prompting message and a mechanical interlock blocking passage 109 is removed, thereby allowing the previously mentioned insertion of the data card 110 into the slot. The function switch 121, as shown in FIG. 2B, includes a first position indicating postage entry, a second position indicating audit and a third position indicating meter check. The flow of operations in each of these three positions is shown in FIG. 6B.

Prior to reaching FIG. 6B, after meter initialization, a scan routine is performed for indicating that the proper sequence of operations has begun. Thus, after meter initialization, the keyboard is scanned to determine whether a key has been depressed. If the key has not been depressed, a shut-down decision block is entered, which may provide either for repeating the scan to determine whether a key has been depressed or to shut down the entire system. In practical use, the shut-down decision block may be provided with a time out function which permits re-scanning within a certain period of time and then shut down if a key has been depressed outside of that period of time. In a shut-down function, two operations are performed: power down and saving memory. In memory saving, the contents of the appropriate registers are placed into a non-volatile memory for the purpose of retaining stored data until the next power-up cycle.

If a key has been depressed, the next decision block determines whether a card has been inserted. If a card has not been inserted, then the meter is instructed to proceed to the routine corresponding to whatever function is indicated by the depression of the key and then return to the scan keyboard routine to repeat the cycle. If a card has been inserted, then the particular following sequence is determined in accordance with the function set by the key switch 121. As noted above, three distinct modes of operation are provided for. The add postage mode, the audit mode and the meter check mode. If the switch is in the add postage mode (position 1), the card is read, the data decrypted, and the combination checked. If invalid, the invalid lamp comes on, the card is rejected and the program goes back to scanning the keyboard. If the card reading function results in a valid check, contents of the descending register are replaced with the descending register plus the added postage as specified on the card. The contents of the control sum register are replaced by the sum of the control sum register and added postage amount. The valid lamp is lighted, the card contents erased, the card ejected and the program then returns to the scanning routine.

In the audit mode (position 2), the card is checked to determine if it is a valid audit card. If not, the invalid lamp is lighted, the card ejected and control returned to the main program. If the card is valid, audit data is read from the meter registers encrypted and recorded on the card. The card is then ejected, the audit lamp lighted and control return to the main program. Similarly, the third position can be used as a meter check function whereupon a card inserted into the meter will have selected operational parameters recorded on it, such as selected register contents. This can be effected by operator control, while in the meter check function, by selected key operation.

With reference to FIG. 7, an exemplary logic circuit for accomplishing the various flow chart functions illustrated in FIGS. 6A and 6B are presented. The Keyboard switch mechanism 300, corresponding to the function switch 121 on the front panel shown in FIG. 2A, is illustrated for three positions, read, meter check and audit. In the read position, appropriate energization is passed through the read cycle timer 302. The purpose of the read cycle timer is to set up a sequence of operations whereby insertion of a card into the postal meter will charge the postal meter in accordance with the information contained on the card. Thus, the card 110 is inserted into a card reader illustrated generally as 304. The presence of the card is indicated by an appropriate cardswitching signal $\overline{CARD}$ which is applied to an AND gate 306. With the presence of a first read cycle signal along the line 308, the gate 306 is enabled, thereby indicating the presence of a card in an appropriate read position within the card reader 304. The output of the gate 306 accomplishes two purposes. First, an energization pulse signal is placed along the line 310 to the read circuitry 312. Read circuitry 312 reads the first block of information on the card which is relative to the digital signature or identification of the postal meter itself. Of primary importance is the uniqueness of the means by which the meter is identified. It is of importance both in terms of security and in terms of accurate auditing procedures. A conventional manner of determining unique identification of the postal meter in a secure manner is by the use of pseudo-random number generation. Such techniques, which have been discussed in U.S. Pat. Nos. 3,800,284 and 3,860,911, both assigned to Pitney Bowes, Inc., the disclosures of each of which are specifically incorporated by reference herein, provide for the generation of a unique random number at the central station and at the remote unit. The term "pseudo-random" is employed because the numbers appear to be random although they are generated by an algorithm. There is no obvious relationship between successive numbers in either sequence; however, the sequences between the local and remote random generators will be the same. Thus, the data card 110 is previously recorded at the central station with a pseudorandom number generated at the station and corresponding to the postal meter in which the card is being inserted. The number is changed with each recharging of the card, the previous number being employed to generate a new random number in accordance with an algorithm contained totally within the pseudo-random number generators both at the remote and local unit. The insertion of the card into the reader 304 causes the pseudo-random generator 314 to be incremented to its next pseudo-random number. This is done by means of a signal applied along the output line 317 of the gate 306 in response to the presence of a card and the beginning read cycle initiated by the read cycling unit 302. The next pseudo-random number is placed in a meter combination register 318, where it is stored until the next charging of the meter. The new combination replaces the old combination previously stored in such register. At the same time, the signal applied along the line 310 to the read unit 312 causes the digital information corresponding to the identification code of the card to be passed along the bi-directional line 320, where it accumulates in the read circuitry. If the information from the card is read correctly, using conventional digital techniques such as parity bits, bit counting or the like, a valid card present signal is applied along the line 322 to the read cycle circuit 302. This in turn places an output signal along the next cycle line 324 to the gate 326, causing the combination read from the card to be passed through the gate 326 and stored in the meter reading combination register 328. Comparison between the information stored in the meter combination register 318 and the read combination register 328 are compared in compare circuit 330. A valid compare appears along line 332 and is applied as a VLID signal to the read cycling timer 302. The presence of a valid ID signal VLID causes an output to appear along the line 334 of the read timer, thereby beginning the next cycling operation. This is reading the next successive block of information relative to the funding information from the card 110. This information is fed along the line 320 to the read circuit 312, along the line 315 and to the gate 316 which is open by virtue of the signal applied from the read cycle timer 302 along the line 334. This information is fed into the funding register 336, which may be a descending register, operating in conjunction with the ascending register 337, and the status of the information so read into the funding register is checked by the valid read circuitry 338. Presence of a valid read, indicating the appropriate information has been fed into the funding register, appears as a VLR signal along the output 340 of the valid read circuit. The VLR signal is applied along the line 340 to the read cycle timing circuitry 302, thereby initiating the next and final read cycle signal appearing along the line 342 as a signal KBD. The signal KBD triggers the operation of the keyboard scan cycle, and the meter now operates in its conventional manner as described in the aforementioned U.S. Pat. Nos. 3,792,446 and 4,097,923. It should be noted that the absence of any of the signals VLID, VLC, VLR, or NCR, to be described further below, are each applied to an OR gate 345, the output of which initiates a shutdown cycle. The shutdown cycle is the same cycle described in the aforementioned U.S. Pat. Nos. 3,792,446 and 4,097,923, wherein information is transferred from working memory to non-volatile memory for permanent storage during shutdown cycles. Several of the signals may be applied to cause the operator to repeat operation, as was discussed in conjunction with FIG. 7 such as the VLC or VLID signal. It may be desirable, however, that other signals merely cause a shutdown, thereby indicating some sort of malfunction in the meter. Since these techniques are conventional, they are not discussed in any further detail here, except to note their use in conjunction with this system.

The read cycle operation having been described, it should be noted that the same logic circuitry may be employed for the audit cycle. In conjunction with an audit operation, the keyboard switch 300 is thrown to the appropriate audit position. The audit position places an initiation signal on the audit timing circuit 350 similar to the read cycle timer 302. The first signal appears along an output 352 and is a test for the presence of a card 110, in the card-reading box 304. The presence of a card is indicated along the line 354, which is applied to the AND gate 356. The output of the AND gate 356, $\overline{CRD}$, indicates a card properly present within a card-reading box 304. It should be noted that appropriate identification of an audit card can be applied at this time, in order to ascertain that the card 110 being placed into the box 304 is an appropriate audit card within the meaning and definition of such cards. Such identification signals may be taken into account in the card identification signal $\overline{CARD}$ applied along the line 354. In any event, the proper recognition of a card in the card box 304 is achieved by virtue of an output signal 358, which is in turn applied as an input to the audit timer 350. In response, the audit timer produces an output along the line 360, which is employed to activate a register select indicator 362. This may be one of the panel selection buttons on the front panel of the meter. Activation of the appropriate panel select button, such as the descending register button, will cause an appropriate input DESR to be applied along the line 364, in turn energizing the AND gate 366, which will allow the $\overline{SHD}$ signal to pass the gate 368. This gate 368 will allow the meter combination register 318 to dump its contents along the output line 370 into a shifting circuit 372. Appropriate timing circuitry not shown, operating in conjunction with the opening of the gate 368 will next cause the shifting of the information in the descending register 336 to be shifted through the shifting circuit 372 along its output line 374, along with the information representative of the meter combination appearing along the line 370. The information representing both the state of the descending register and the identification of the meter is thus fed along the line 374 to a further AND gate 376 and then into the read circuitry 312. The read circuitry 312 responds to the receipt of the information from the gate 376 and operates to encode the information directly onto the card 110 through the appropriate transducing circuitry, which in this instance serves as a writing mechanism for recording information directly onto the card 110.

Upon completion of the shifting of the information from the shift register 372, an appropriate complete shift signal CS is applied along the line 378 as an input to the audit write cycle timer 350. In response thereto, the audit write cycle timer outputs an AUD signal, which is applied to a gate 380 and to the read/write circuitry 312. The effect of this mechanism is to read back the information previously recorded and check the content of the information recorded on the card with the actual content of the information derived from the funding or descending register 336. A non-compare between the two registers, indicating some form of error, provides an output signal along the line 384 from the gate 380, indicating a non-compare NCR signal. The NCR signal is also applied through the gate 345 and results in a shutdown of the mechanism for malfunction purposes.

The contents of the funding register 336 are continually monitored. Upon reaching a predetermined minimal level, set in register 390, a compare circuit 392 provides a signal causing print lockout means 394 to cause the printing mechanism to lock up.

Although not shown in FIG. 7, it will be understood that the line representing switch position 3, emanating from the keyboard switching block 300 may be coupled through similar logic circuitry incorporating similar elements as that shown in FIG. 5 for the purpose of effecting the meter recording function.

Figure 8:
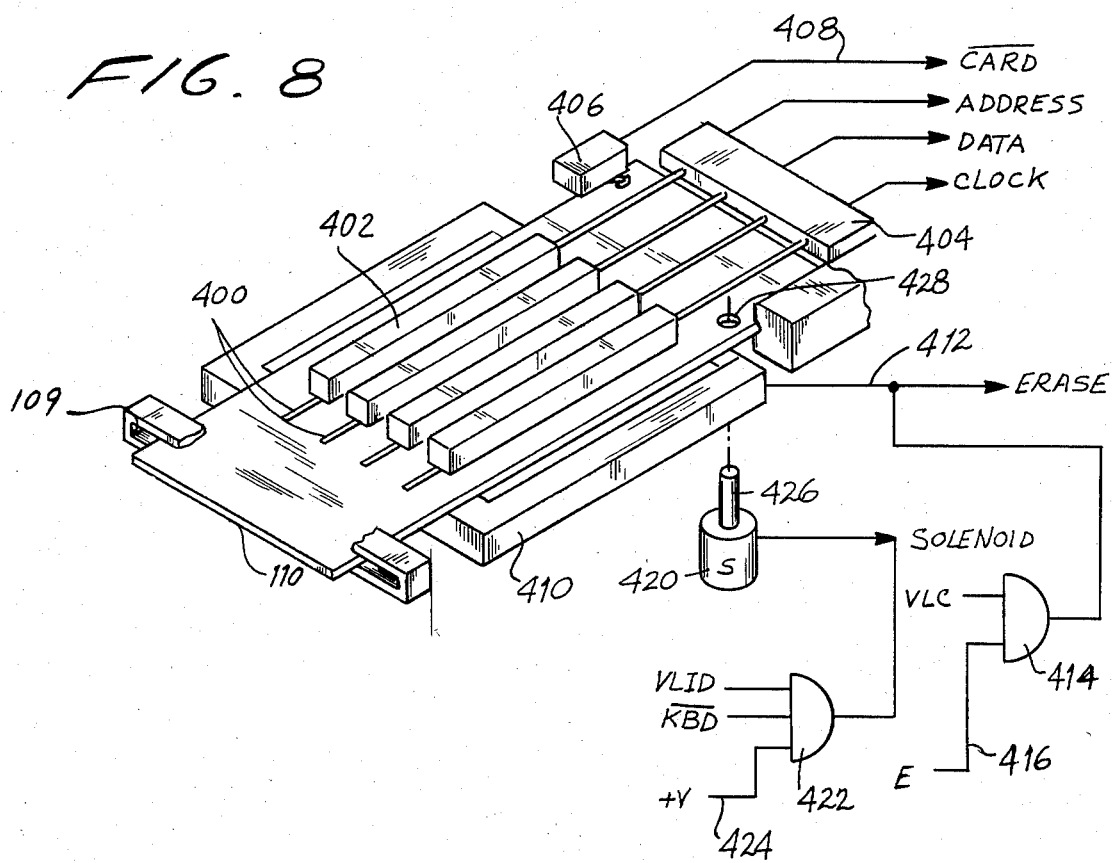
FIG. 8 is a perspective and logic diagram view illustrating the operation of the reading of the data-input card.

Turning to FIG. 8, there is shown a mechanism suitable for recording information and erasing information from the card 110. As shown, a card 110 is provided with a plurality of magnetic tracks 400. Interacting with the magnetic tracks is a plurality of recording heads 402, operable in accordance with conventional technology for the recording and reading of information. Information is applied by means of suitable addressing circuits 404, which include addressing means, data means and a clock signal. These inputs and outputs are conventional in the application of recording and reading from magnetic tracks. A device which is a microswitch 406 may be provided for indicating the proper presence of a card seated in the proper location, and in turn providing an output signal along the line 408 indicating the logic card CARD. Positioned beneath the card 110 is a bulk-erasing mechanism 410. The erasing mechanism is energized by the application of a suitable signal along the line 412, which applies a high-level erasing signal to the plate beneath the card, thereby simultaneously erasing all of the information recorded thereon. As is previously noted, the card is erased upon the sensing of a valid combination VLID. This may be effected simply by the application of the logic signal VLC, derived from FIG. 7, to the logic AND gate 414, in coincidence with the erasing signal E applied along the line 416 to the gate 414, thereby resulting in the bulk erasure of the card after the receipt of the valid combination signal. Similarly, the card-locking mechanism noted in conjunction with the flow operation of FIGS. 6A, 6B may be provided by means of a suitable solenoid 420, electrically activated along an S input line by means of a coincidence signal applied through the logic AND gate 422. The solenoid is energized upon a coincidence of a VLID signal, see FIG. 7, and the absence of a keyboard signal KBD in coincidence with a suitable energizing signal applied along the line 424. When the keyboard signal is present, indicating the combination has been recognized as valid, the card is released. Additional security is thereby provided in that if an improper card has been inserted into the meter, the solenoid will lock the card into position by virtue of the action of the solenoid shaft 426 rising up through the previously formed hole 428 on the card 110. The card will thus be locked in position until the card recognizes the valid charging amount. If for some reason the card has a proper combination but an improper charging, the solenoid will lock the card in position. The solenoid can also be used to block entry of any card until proper keying of the postal meter. The card will thus remain in position until Pitney Bowes' service representative is called to service the machine. Obviously, other variations of the solenoid locking mechanism may be employed for the purposes of security, this being only one preferred embodiment for effecting a secure mechanism.

Although the card 110 has been described as a magnetically recordable card, it will be understood that the means for recording information on the card may also be utilized. For example, optical recording, using film, or the Weigand effect could also be employed. In addition, the recording of post-code information in the form of microscopic pits carved by laser beams, such as is used in conventional video disc technology, may also be employed. To this end, the record/read heads are replaced by optically guided laser beams reflected from the microscopically recorded pits, the resulting pulse information derived by means of reflections converted into a pulse-coded signal which may be demodulated by the receive heads located within the meter electronics. Recording mechanisms are then made available to the postal authorities for the purposes of recording additional information on the card. The audit function may similarly be realized by employing both recording and playback lasers in the mechanism itself.

Figure 9:
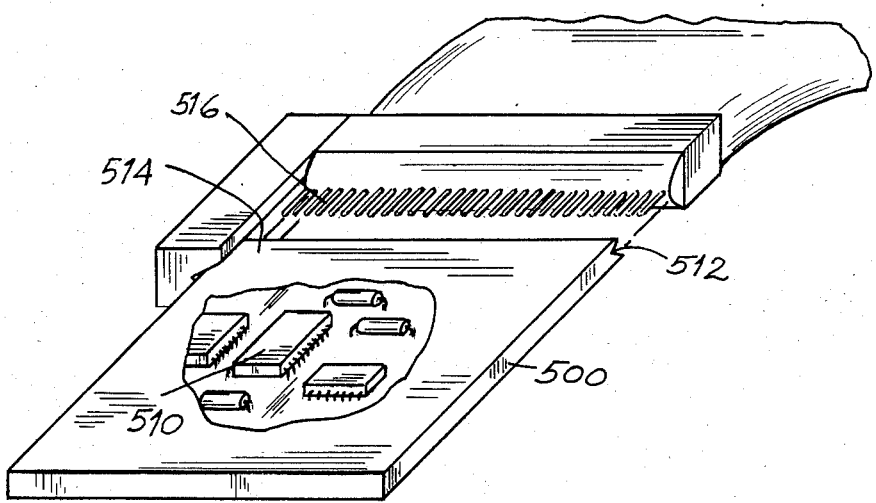
FIG. 9 is a plan view illustration of an alternative embodiment of the input card.
Figure 10:
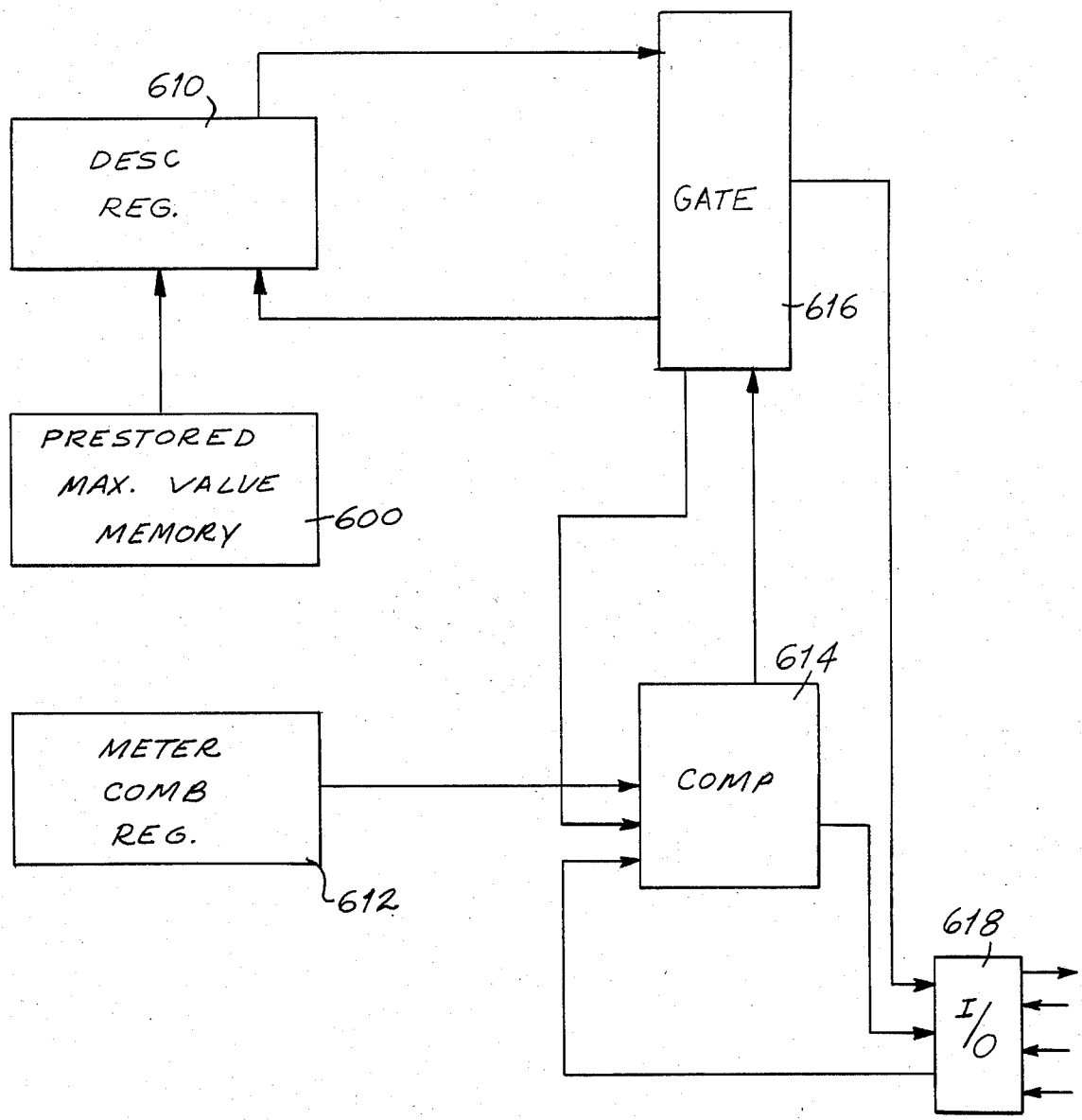
FIG. 10 is a logic diagram illustrating the inter-relationship of components on the card of FIG. 9.

It will also be understood that the use of the conventional micro-electronic technology, and conventional semiconducting technology, enable the manufacturer of the card 110 to include elements in addition to or in substitution for magnetically recordable elements. Thus, for example, referring to FIG. 9, it is conceivable that the card can contain a plurality of electronic semiconductor components, imbedded on printed circuit cards, and containing various elements which may be employed in conjunction with the postal meter itself. Thus, as shown in FIG. 9, a card 500 may be provided with a plurality of semiconductor components 510. The card would consist of an edge connector segment 512 adapted to slide into the postal meter along appropriate guideways 514 for purposes of mating with a complementary conductor type 516. As shown in FIG. 10, the card 500 includes a pre-stored maximum value memory 600, which may be prepared and set into the card 500 by the postal authorities. One example of the replaceable semiconductor component upon a largescale printed circuit card which is insertable into a larger mechanism, is disclosed in U.S. Pat. No. 4,084,242, and assigned to the assignee of the present invention, the disclosure of which is incorporated by reference. Also included on the card is a descending register 610, a master combination register 612, comparison circuitry 614 and gating circuitry 616, all interfacing with an input/output component 618. The input/output component 618 connects to the connecting means 512–516, so as to make connection with the components within the postal meter. In operation, the postal authorities pre-store onto the card, by means of direct insertion, a semiconductor component corresponding to 600 and 612, thereby storing pre-stored maximum postage values and combination identification means. The unit is then plugged into the computer and operates in accordance with the general electronics discussed in connection with FIGS. 6 and 7. Upon energization, the meter combination register inserts its value into the comparator 614, which in turn receives the combination value already previously generated by the meter electronics as was described above. This value is to be fed in through the input/output unit 618 and the comparison made within the comparator 614. The results of the comparison are then applied both to the meter electronics through the input/output 618 and is employed to open the gate 616 and allow the input/output circuit 618 to pulse the descending register, thereby enabling the information transferred from the maximum value memory into the descending register to be transferred through the gate 616 and into the postal meter through the input/output circuitry 618. Power for the semiconductor electronics can be derived from the meter itself, and the power-down concepts of transfer of information from the descending register into the non-volatile storage within the postal meter electronics would remain operative as was discussed above, and in conjunction with the prior U.S. Pat. Nos. 4,097,923 and 3,792,446. Alternatively, the descending register 610 may itself be a non-volatile register. It is also possible for the descending register to be a PROM component, which is erased when read, so that as its contents are removed, the memory is progressively destroyed. Therefore, its contents would contain only that which is true memory, and would be unalterable except in a descending manner.

In a further alternative form, the user may program his own memory card, either by means of replaceable semiconductor chips or by magnetically recording information thereon by use of the telephone link described in U.S. Pat. Nos. 4,097,923 and 3,792,446.

The magnetic card, or card containing electronics, may each be operable to serve as the descending register of the meter as described hereinabove and sense and monitor the use of the meter until the balance of the encoded dollar amount reaches a predetermined level, at which time the meter becomes locked and the information encoded on the card related to security destroyed. Although erasing is described as taking place as soon as the meter recognizes the charging amount contained on the card, it will be understood that the card may contain such information until the end of the use of such information by the meter, such as complete depletion of the charged amount, at which time the information is destroyed. It is also alternatively possible to retain the information without destroying same.

The concept of generating pseudo-random locking combinations has been described in prior patents, such as U.S. Pat. No. 3,800,284, and U.S. Pat. No. 3,860,911, both assigned to the assignee of the present invention. Disclosures of both of these patents are specifically incorporated herein by reference and are intended to provide a disclosure whereby means for generating sequential random combinational numbers may be incorporated into the concept of the present invention.

What is claimed is:

1. In a microprocessor controlled postal meter system having a postal meter with a postage printer and an accounting means for maintaining an accurate record of account of an amount chargeable, a central memory, and a data entry means for entering data into said meter system, the improvement being a method of recharging said meter system comprising the steps of: generating a truly random sequence of comginations, combining said combinations with fixed chargeable amounts of postage in accordance with a predetermined pattern to form a sequence of charging combinations, storing said charging combinations in said meter system central memory in a non-alterable manner, storing said charging combinations in a central postal authority computer bank, issuing upon request a further unique charging combination from said central postal authority computer bank encompassing both a postal meter identification and a charging combination representing a specific desired postal amount, entering said further unique charging combination onto said data entry means, inserting said data entry means into a postal meter system, said central memory recognizing said unique charging combination relative to said postal meter system, decoding therefrom the encoded postal amount, entering same in said accounting means.

2. The method of claim 1, wherein said unique charging combination is imprinted upon a portable data entry medium.

3. In a microprocessor system having a device with a printer and an accounting means for maintaining an accurate record of account of an amount chargeable, a central memory, and a data entry means for entering data into said system, the improvement being a method of recharging said system comprising the steps of generating truly random sequences of combinations, combining said combinations with a fixed chargeable amount in accordance with a predetermined pattern to form a sequence of charging combinations, storing said charging combinations in said system central memory in a non-alterable manner, and in a central computer bank, issuing upon request a unique charging combination by said central computer bank in accordance with a specific desired amount, and recharging said device by entry of said unique charging combination onto said data entry means, whereby said central memory recognizes said unique charging combination, decodes therefrom the said desired amount, and enters same in said accounting means.

4. The method of claim 3, wherein said unique charging combination is imprinted upon a portable data entry medium.

* * * * *